US010026398B2

(12) United States Patent
Behzadi et al.

(10) Patent No.: US 10,026,398 B2
(45) Date of Patent: Jul. 17, 2018

(54) FOLLOW-UP VOICE QUERY PREDICTION

(71) Applicant: Google LLC, Mountain View, CA (US)

(72) Inventors: Behshad Behzadi, Freienbach (CH);
Dmitry Osmakov, Zurich (CH);
Martin Baeuml, Hedingen (CH); Gleb Skobeltsyn, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/205,505

(22) Filed: Jul. 8, 2016

(65) Prior Publication Data

US 2018/0012594 A1    Jan. 11, 2018

(51) Int. Cl.

| G10L 15/183 | (2013.01) |
|---|---|
| G06F 17/30 | (2006.01) |
| G10L 15/14 | (2006.01) |
| G10L 15/02 | (2006.01) |
| G10L 15/26 | (2006.01) |
| G10L 15/18 | (2013.01) |

(52) U.S. Cl.
CPC ...... *G10L 15/183* (2013.01); *G06F 17/30684* (2013.01); *G10L 15/02* (2013.01); *G10L 15/14* (2013.01); *G10L 15/1815* (2013.01); *G10L 15/26* (2013.01)

(58) Field of Classification Search
CPC ...................................................... G10L 15/22
See application file for complete search history.

(56) References Cited

U.S. PATENT DOCUMENTS

| 7,620,549 | B2 | 11/2009 | Di Cristo et al. |
|---|---|---|---|
| 7,725,307 | B2 | 5/2010 | Bennett |
| 7,912,702 | B2 | 3/2011 | Bennett |
| 9,466,294 | B1 * | 10/2016 | Tunstall-Pedoe ....... G10L 15/22 |

(Continued)

FOREIGN PATENT DOCUMENTS

| CN | 103871403 | 6/2014 |
|---|---|---|
| KR | 20060070605 | 6/2006 |

OTHER PUBLICATIONS

Chelba, Ciprian, and Johan Schalkwyk. "Empirical exploration of language modeling for the google. com query stream as applied to mobile voice search." Mobile Speech and Advanced Natural Language Solutions. Springer New York, 2013. 197-229.*

(Continued)

*Primary Examiner* — Brian L Albertalli
(74) *Attorney, Agent, or Firm* — Fish & Richardson P.C.

(57) ABSTRACT

Methods, systems, and apparatus, including computer programs encoded on a computer storage medium, for predicting follow-up queries to an initial transcription of an utterance. In some implementations, one or more follow-up queries that are pre-associated with a transcription of an initial utterance of a user are identified. A new or modified language model in which a respective probability associated with one or more of the follow-up queries is increased with respect to an initial language model is obtained. Subsequent audio data corresponding to a subsequent utterance of the user is then received. The subsequent audio data is processed using the new or modified language model to generate a transcription of the subsequent utterance. The transcription of the subsequent utterance is then provided for output to the user.

18 Claims, 3 Drawing Sheets

(56) References Cited

U.S. PATENT DOCUMENTS

| | | | |
|---|---|---|---|
| 2005/0055210 A1* | 3/2005 | Venkataraman | G10L 15/183 704/255 |
| 2005/0131695 A1* | 6/2005 | Lucente | G10L 15/22 704/257 |
| 2005/0137868 A1* | 6/2005 | Epstein | G10L 15/183 704/252 |
| 2008/0153465 A1 | 6/2008 | Evermann et al. | |
| 2008/0154870 A1 | 6/2008 | Evermann et al. | |
| 2008/0221898 A1 | 9/2008 | Cerra et al. | |
| 2010/0114944 A1* | 5/2010 | Adler | G10L 13/027 707/770 |
| 2011/0004462 A1* | 1/2011 | Houghton | G10L 15/183 704/9 |
| 2011/0077942 A1* | 3/2011 | Ljolje | G10L 15/065 704/244 |
| 2015/0194148 A1 | 7/2015 | Wong et al. | |
| 2015/0370787 A1 | 12/2015 | Akbacak et al. | |
| 2016/0104482 A1 | 4/2016 | Aleksic et al. | |
| 2016/0148610 A1* | 5/2016 | Kennewick, Jr. | G10L 15/18 704/240 |

OTHER PUBLICATIONS

Aleksic, Petar, et al. "Bringing contextual information to Google speech recognition." Sixteenth Annual Conference of the International Speech Communication Association. 2015.*

Chelba, Ciprian, Xuedong Zhang, and Keith Hall. "Geo-location for voice search language modeling." Sixteenth Annual Conference of the International Speech Communication Association. 2015.*

Hall, Keith, et al. "Composition-based on-the-fly rescoring for salient n-gram biasing." Sixteenth Annual Conference of the International Speech Communication Association. 2015.*

Jyothi, Preethi, et al. "Distributed discriminative language models for Google voice-search." Acoustics, Speech and Signal Processing (ICASSP), 2012 IEEE International Conference on. IEEE, 2012.*

Kamvar, Maryam, and Ciprian Chelba. "Optimal size, freshness and time-frame for voice search vocabulary." arXiv preprint arXiv:1210.8436 (2012).*

International Search Report and Written Opinion issued in International Application No. PCT/US2017/038917, dated Sep. 18, 2017, 9 pages.

Bhargava et al. "Easy contextual intent prediction and slot detection," IEEE International Conference on Acoustics, Speech and Signal Processing, May 31, 2013, 5 pages.

* cited by examiner

FOLLOW-UP VOICE QUERY PREDICTION

FIELD

The present specification relates to automated speech recognition (ASR)

BACKGROUND

Speech recognition refers to the transcription of spoken words into text using an automated speech recognizer (ASR). In traditional ASR systems, received audio is converted into computer-readable sounds, which are then compared to a dictionary of words that are associated with a given language.

SUMMARY

In general, one innovative aspect of the subject matter described in this specification can be embodied in methods that improve voice recognition accuracy by identifying a set of follow-up voice queries that are likely to be subsequently provided by a user, and adjusting a language model to increase the respective probabilities associated with the follow-up voice queries. For instance, after receiving an initial query from a user, e.g., a text query, or other types of user input, a set of predicted follow-up queries that are pre-associated with the initial voice query are predicted. An ASRM may then adjust the respective probabilities within a language model associated with the predicted follow-up queries such that the processing of a subsequent voice query from the user is more likely to transcribe the subsequent voice query as one of the predicted follow-up voice queries. In this regard, the methods described enable the ASRM to more accurately account for the changes in probabilities associated with subsequent voice query submission once the user has already provided an initial query.

Implementations may include one or more of the following features. For example, a computer-implemented method may include: identifying one or more follow-up queries that are pre-associated with a transcription of an initial utterance of a user; obtaining a new or modified language model in which a respective probability associated with one or more of the follow-up queries is increased with respect to an initial language model; receiving subsequent audio data corresponding to a subsequent utterance of the user; processing the subsequent audio data using the new or modified language model to generate a transcription of the subsequent utterance; and providing the transcription of the subsequent utterance for output to the user.

In some implementations, a computer-implemented method may include: identifying one or more follow-up queries that are pre-associated with one or more search results associated with a transcription of an initial utterance of the user; obtaining a new or modified language model in which a respective probability associated with one or more of the follow-up queries is increased with respect to an initial language model; receiving subsequent audio data corresponding to a subsequent utterance of the user; processing the subsequent audio data using the new or modified language model to generate one or more search results associated with the transcription of the subsequent utterance; and providing the one or more search results associated with the transcription of the subsequent utterance for output to the user.

In some implementations, a computer-implemented method may include: identifying one or more follow-up queries that are pre-associated with data associated with one or more of the search results associated with the transcription of the initial utterance of the user; obtaining a new or modified language model in which a respective probability associated with one or more of the follow-up queries is increased with respect to an initial language model; receiving subsequent audio data corresponding to a subsequent utterance of the user; processing the subsequent audio data using the new or modified language model to generate data associated with one or more search results associated with the transcription of the subsequent utterance; and providing the data associated with one or more search results associated with the transcription of the subsequent utterance for output to the user.

Other versions include corresponding systems, and computer programs, configured to perform the actions of the methods encoded on computer storage devices.

One or more implementations may include the following optional features. For example, in some implementations, the methods may further include: receiving initial audio data corresponding to an initial utterance of a user; and processing the audio data using an initial language model to generate a transcription of the initial utterance.

In some implementations, obtaining a new or modified language model includes: accessing a database including one or more follow-up query mappings, each follow-up query mapping specifying a list of candidate follow-up queries for (i) prior transcriptions of utterances of the user, (ii) prior search results associated with the user, and (iii) data associated with the prior search results associated the user; determining that one or more terms of the transcription of the initial utterance of the user are included within the one or more follow-up query mappings; and adjusting the initial language model to increase the respective probability associated with the list of candidate follow-up queries that correspond to the one or more terms of the transcription of the initial utterance of the user that are included within the one or more follow-up query mappings.

In some implementations, determining that one or more terms of the transcription of the initial utterance of the user are included within the one or more follow-up query mappings includes determining that the particular context associated with the initial utterance of the user matches a context associated with a particular transcription of a prior utterance of the user.

In some implementations, each of the one or more follow-up query mappings further specifies one or more follow-up terms for (i) prior transcriptions of utterances of the user, (ii) prior search results associated with the user, and (iii) data associated with the prior search results associated the user.

In some implementations, processing the audio data using the new or modified language model includes determining that a particular context associated with the initial utterance of the user matches a particular context associated with the subsequent utterance of the user.

In some implementations, processing the audio data using the new or modified language model includes determining that a user location associated with the initial utterance of the user matches a user location associated with the subsequent utterance of the user.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Voice queries that are sequentially submitted by a user are often misrecognized by automated speech recognition systems because language models used to process subsequent voice queries often do not reflect inherent relationship between an initial voice query and a subsequent voice query submitted by the same user within a particular time period or user context. For instance, since a language model specifies static probabilities for a set of n-grams, query processing for a subsequent voice query based upon the same language model often fails to appreciate a user's increased likelihood to provide a subsequent voice query that includes terms that are pre-associated with a previously submitted voice query. This often causes misrecognition of subsequent low quality voice queries that have multiple candidate transcriptions specified by a static language model.

Accordingly, techniques are described to improve voice recognition accuracy by identifying a set of follow-up voice queries that are likely to be subsequently provided by a user, and adjusting a language model to increase the respective probabilities associated with the follow-up voice queries. For instance, after receiving an initial query from a user, an automated speech recognition module (ASRM) may identify a set of predicted follow-up queries that are pre-associated with the initial query. The ASRM may then adjust the respective probabilities within a language model associated with the predicted follow-up queries such that the processing of a subsequent voice query from the user is more likely to transcribe the subsequent voice query as one of the predicted follow-up voice queries. In this regard, the methods described enable the ASRM to more accurately account for the changes in probabilities associated with subsequent voice query submission once the user has already provided an initial query.

Figure 1:
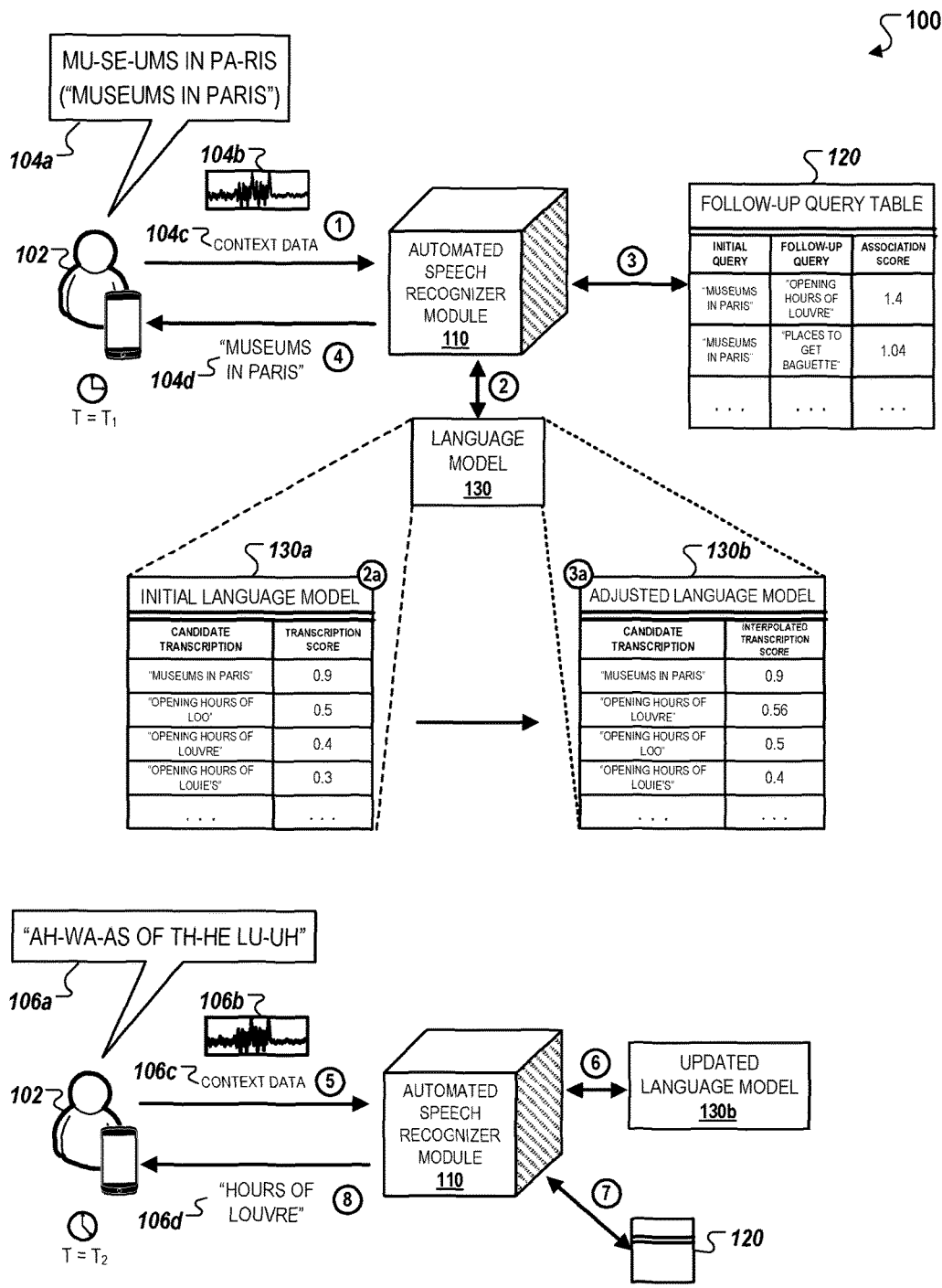
FIG. 1 is an exemplary system that may be perform speech recognition using predicted follow-up queries for a user.

FIG. 1 illustrates an exemplary system 100 that may be used to perform speech recognition using predicted follow-up queries for a user 102. The system 100 includes an ASRM 110 that is capable of receiving audio data 104b encoding utterance of a voice query of the user 102 and context data 104c associated with audio data 104b (e.g., user location), and generating a transcription 104d of the audio data 104b using speech recognition techniques described in greater detail below.

In general, after receiving the audio data 104b and the context data 104c, the ASRM 110 accesses a table 120 that includes a set of query mappings to identify follow-up queries that the user 102 is likely to submit based on a particular relationship between a submitted query and the follow-up queries, e.g., queries submitted within the same user location, or queries associated with a common topic.

In more detail, the user 102 utters the initial voice query 104a through a user device. The user device may be any type of computing device that includes a microphone, such as a smartphone, tablet computer, laptop computer, or desktop computer. The user device may present the user 102 with a user interface that is displayed through any mobile or desktop operating system that allows the user 102 to provide a voice query and/or display visual content, e.g., search results, in response to a user query.

The voice query 104a may include various types of voice-enabled input such as voice searches, voice commands, or dictation that are recognized and processed by the ASRM 110 using common speech recognition technique.

The ASRM 110 generates an initial transcription 104d for the audio data 104b by initially using an acoustic model to phonetically transcribe the utterance of the initial voice query 104a. The ASRM 110 then selects an n-gram specified within the language model 130 that represents the greatest likelihood of being an accurate transcription of the utterance of the initial voice query 104a. In some instances, the ASRM 110 may bias the language model 130 based on the received context data 104c to select a particular n-gram that reflects the greatest likelihood of being an accurate transcription of the utterance of the initial voice query 104a given the likely context associated with the user 102 indicated by the context data 104c. The generated initial transcription 104d is then transmitted for output to the user device in response to the received initial voice query 104a.

In the example depicted in FIG. 1, in response to receiving the audio data 104b encoding the utterance "MU-SE-UMS IN PA-RIS" of the initial voice query 104a, the ASRM 110 transcribes the n-gram "MUSEUMS IN PARIS" as the initial transcription 104d based on the language model 130a specifying the greatest transcription score, "0.9" relative to other candidate transcriptions for the audio data 104b.

Upon receiving a voice query from the user 102, the ASRM 110 also identifies a set of follow-up queries that the user 102 is likely to provide given the terms included within the voice query 104a. For instance, the ASRM 110 may identify follow-up queries for the user 102 based on accessing a set of query mappings that specifies a follow-up query for an initial voice query. For each query mapping, the table 120 further specifies an association score reflecting a likelihood that the user 102 will provide the specified follow-up query within a predetermined time after providing the specified initial voice query.

In some implementations, instead of specifying follow-up queries for the user 102 for a particular initial voice query, the query mappings within the table 120 may instead specify one or more terms or entities that are pre-associated with the particular initial voice query. In such implementations, the identified terms or entities can be used to up-weight respective transcription scores associated with individual terms within the initial language model 130a in order to generate a new or adjusted language model 130b.

In some implementations, the query mappings included within the table 120 further include follow-up queries that are identified as such because of their phonetic similarity to the top transcription hypothesis for the initial voice query 104a. For instance, if a transcription hypothesis for a particular initial voice query is "OPENING HOURS OF LUFRE," then the table 120 may include a query mapping that specifies "OPENING HOURS OF LOUVRE" as a follow-up query based on the phonetic similarity between the terms "LUFRE" and "LOUVRE." In this regard, commonly incorrect transcriptions may be associated with correctly identified follow-up queries within the table 120 given the increased likelihood that the user 120 may re-submit the same query after receiving an incorrect transcription as output from the ASRM 110.

In some implementations, the query mappings within the table 120 may specify follow-up queries for search results that are associated with the initial transcription 104d of the utterance of the initial voice query 104a. For instance, the user 102 may submit the initial voice query 104a as a form of input to a search engine to perform a search for terms included within the initial transcription 104d. The search results data returned by the search engine may then be logged and included within the table 120 for use by the ASRM 110 in processing a subsequent voice query that is either associated with, or includes, terms that are included within the search results for the initial transcription 104d.

In some implementations, the query mappings within the table 120 may additionally specify follow-up queries for data associated with the search results for the transcription 104d. For instance, the data associated with the search results may include prior search queries transmitted by the user 102 within a particular time period, prior search results obtained for a search query that is determined to be similar to the search results associated with the initial transcription 104d, terms included within documents determined to be responsive to the search query associated with the initial transcription 104, among others. The data associated with the search results may also include user history data and query logs associated with the user 102 such as prior submitted voice queries, browsing activity prior candidate transcriptions, or other types of user-specific information.

In some implementations, the query mappings within the table 120 may additionally specify follow-up queries based on data associated with other users in addition to the user 102. For instance, the follow-up queries within the table 120 can be determined based on prior queries submitted by a clusters of users that are determined to be similar to the user 102, e.g., users in the same location, or users that have submitted similar queries and/or have received similar search results or follow-up queries as the user 102. In each of these examples, the ASRM 110 is capable of using data clustering techniques to aggregate the data received from multiple users in order to identify patterns or predictions that are likely to be relevant to the user 102.

The magnitude of the association score between each specified initial voice query and follow-up query may be based on and/or augmented by various types of data associated with the user 102 as described above. In some implementations, the magnitude of the association score may be based on the particular location of the device associated with the user 102 when the audio data 104b is received by the ASRM 110. In such implementations, the value of association score may reflect the likelihood that terms included within the particular initial voice query and the follow-up query are repeatedly sent within a particular period of time by either user 102 or other users at the location that are determined to be similar to the user 102. In this example, this determination may be based on training data including prior queries submitted by the user 102 and the other users at the particular location.

In the example depicted in FIG. 1, the table 120 specifies follow-up queries that include the terms, e.g., "LOUVRE," "BAGUETTE," that are determined to be associated with terms within the query 104a, e.g., "MUSEUMS" and "PARIS." The table 120 further specifies a higher associated score for the follow-up query "OPENING HOURS OF LOUVRE" compared to "PLACES TO BAGUETTE" since the term "LOUVRE" described relates to a museum and is located in Paris, whereas the term "BAGUETTE" is only associated with the term "MUSEUM" with respect to its relation to Paris.

The ASRM 110 then uses the identified follow-up queries within the table 120 to adjust the language model 130. In particular, the identified follow-up queries are used to bias the language model 130 to increase the respective probability associated with a particular n-gram within the language model 130 that corresponds to a follow-up query included within the table 120, increasing the likelihood that the ASRM 110 selects the particular n-gram as a transcription of a subsequent query that is associated with the utterance of the initial voice query 104a.

The increase in the respective probability associated with a particular n-gram within the new or updated language model 130b, relative to the initial language model 130a, corresponding to a follow-up query specified by the table 120 are computed to a specific value to prevent any erroneous transcription of the subsequent voice query 106a. For example, in some instances, the value of the association scores are modulated by the ASRM 110 such that the calculation of the interpolated transcription scores within the new or adjusted language model 130b are modest increases over the transcription scores within the initial language model 130a. This is to ensure that the interpolated transcription scores are not significantly higher to cause a dramatic change in query processing by the ASRM 110 in using the new or adjusted language model 130b instead of the initial language model 130a. In another example, instead of modulating the association score for each of the follow-up queries, the specific computation technique used by the ASRM 110 may instead be adjusted to cause the same result. In such examples, the interpolated transcription score calculation techniques may include the use of decay factors and/or down-weights to reduce the value of the initially computed interpolated transcription score.

In the example depicted in FIG. 1, the ASRM 110 initially identifies the follow-up query "OPENING HOURS OF LOUVRE" with an association score "1.4" as the most likely follow-up query for the initial voice query 104a. The ASRM 110 then generates an updated language model 130b that specifies an interpolated transcription score for the n-gram "OPENING HOURS OF LOUVRE" with a greater value relative to the corresponding transcription score for the same n-gram within the initial language model 130. In this example, the ASRM 110 computes a product of the initial transcription score, "0.5," and the association score specified by the table, "1.4," to assign the interpolated transcription score of "0.56."

Although FIG. 1 depicts the initial language model 130a and the adjusted language model 130b as different dynamic states of the language model 130, in some implementations, the ASRM 110 may instead generate a new language model that provides the interpolated to transcription scores for the particular n-grams that correspond to the follow-up queries specified for the initial voice query 104a. In such implementations, the ASRM 110 may be capable of dynamically selecting a particular language model, from among a plurality of available language models, to generate a transcription for a subsequent voice query based on various types of data associated with the user 102 as described herein.

In some implementations, the system 100 may include a separate hardware or software module for either performing language model adjustment or generation as described herein. For example, the ASRM 110 may initially identify the follow-up queries for the initial voice query 104a, extract data from the table 120 corresponding to the identified follow-up queries, and then transmit to the initial language model 130a and the extracted data to a post-processing module for language module interpolation. As described herein, the post-processing component may either generate an adjusted language model with interpolated transcription scores or generate a new language model with corresponding transcription scores.

In some instances, the ASRM 110 may interpolate the transcription scores of multiple n-grams within the language model 130 that correspond to multiple identified follow-up queries within the table 120. For example, the ASRM 110 may interpolate the transcription scores of n-grams of corresponding follow-up queries that have an associated score greater than a predetermined threshold value. Alternatively, in other implementations, the ASRM 110 may instead only interpolate the transcription score of the n-gram corresponding the follow-up query within the table 120 with the greatest association score. In this regard, sensitivity of language model biasing for subsequent queries may be adjusted based on the particular interpolation technique used by the ASRM 110.

After generating the new or adjusted language model 130b, the ASRM may subsequently use the new or adjusted language model 130b to process the audio data 106b encoding an utterance of the subsequent voice query 106a of the user 102. At the time point $T_2$ when the ASRM 110 processes the audio data 106b, the new or adjusted language model 130b has already been interpolated to include increased transcription scores for particular n-grams that correspond to follow-up queries previously identified for the initial voice query 104a submitted by the user 102 submitted at time point $T_1$.

Processing of the audio data 106b using the new or updated language model 130 increases the likelihood that the selected n-gram for the subsequent transcription 106d will be at least one of the follow-up queries identified within the table 120. This is particularly important when the subsequent voice query 106a includes an ambiguous utterance that is likely to be incorrectly transcribed by the ASRM 110.

For instance, in the example depicted in FIG. 1, after transmitting an initial user query that is unambiguously transcribed, e.g., "MUSEUMS IN PARIS," the user then transmits a subsequent voice query that is relatively ambiguous and susceptible to an incorrect transcription. For example, the utterance "AH-WA-AS OF TH-HE LU-UH" may be transcribed either as "HOURS OF LOO," "HOURS OF LOUIE'S," or "HOURS OF LOUVRE." However, because the ASRM 110 processes the audio data 106b using the updated or new language mode 130b, the ASRM 110 is more likely select the transaction "HOURS OF LOUVRE" given that it was identified in the table 120 and pre-associated with the "PARIS" term included in the prior voice query 104a. The subsequent transcription 106d is therefore selected based at least on its association with the initial voice query 104a, and as a result, provided to a device associated with the user 102 for output.

In some implementations, the speech recognition techniques used by the ASRM 110 based on the identified follow-up queries, as described throughout with respect to FIG. 1, are subject to restrictions to ensure that the subsequent transcription 104d is not inadvertently and/or inaccurately transcribed with respect to a follow-up query that is actually not associated with the subsequent voice query 106a. For example, in some implementations prior to processing the audio data 106b with a particular language model, the ASRM 110 may initially determine if the likely user context indicated by the context data 104c sufficiently corresponds with the likely user context indicated by the context data 106. If the user context does not sufficiently correspond, then the ASRM 110 may determine that the user context has changed between the time points $T_1$ and $T_2$, indicating that the subsequent voice query 106b is unlikely to reflect at least one of the identified follow-up queries for the initial voice query 104b. In this instance, the ASRM 110 may terminate processing based on the new or adjusted language model to prevent generating an incorrect transcription for the audio data 106b.

In another example, the ASRM 110 may use additional query processing techniques to identify a semantic drift between the initial voice query 104a and the subsequent voice query 106a. For instance, the ASRM 110 may use natural language processing techniques to compare identified terms within the initial voice query 104a and the subsequent voice query 106a to determine if word usage by the user 102 has changed at the time point $T_2$ relative to the word usage by the user 102 at the time point $T_1$. If the ASRM 110 determines that the semantic drift is greater than a predetermined threshold, then the ASRM 110 may terminate processing of the audio data 106b based on the new or adjusted language model to prevent generating an incorrect transcription for the audio data 106b.

The ASRM 110 may additionally perform a variety of post-processing techniques to verify that there is sufficient continuity between the received initial voice query 104a and the subsequent voice query 106a ensure that query processing using the new or adjusted language model 130b results in an accurate transcription. For example, continuity between the initial voice query 104a and the subsequent voice query 106a may be computed as an aggregate score based on specific weights associated with factors that indicate similarity between the queries (e.g., user context, terms included in the query, etc.).

In some implementations, the ASRM 110 is capable of identifying new terms included within the initial voice query 104a that are not specified within the initial language model 130a or the ASRM vocabulary, and then dynamically adding the new terms into the adjusted language model 130b and/or the ASRUM vocabulary on per-query basis. For instance, in the example depicted in FIG. 1, if the initial language model 130a does not include the term "LOUVRE," the ASRM 110 may determine that this term is associated with the initial voice query "MUSEUMS IN PARIS," and in response, add in the term "LOUVRE" into the adjusted language model 130b. In this regard, the addition of newly identified terms within prior queries enables the ASRM 110 to generate candidate voice recognition hypotheses that would have otherwise been missed using the initial language model 130a.

Although FIG. 1 illustrates an example of the ASRM 110 identifying a set of follow-up queries in response to receiving the initial voice query 104a, in some implementations, the ASRM 110 is capable of identifying follow-up queries in response to receiving other types of user inputs. In such implementations, the user input can include typed queries, e.g., search queries provided to a search engine, recent messages and/or emails sent by the user 102, queries that are provided within other applications that are separate from the ASRM 110. In this regard, the ASRM 110 is capable of identifying follow-up queries based on terms that are included within both prior voice queries and typed queries.

Figure 2:
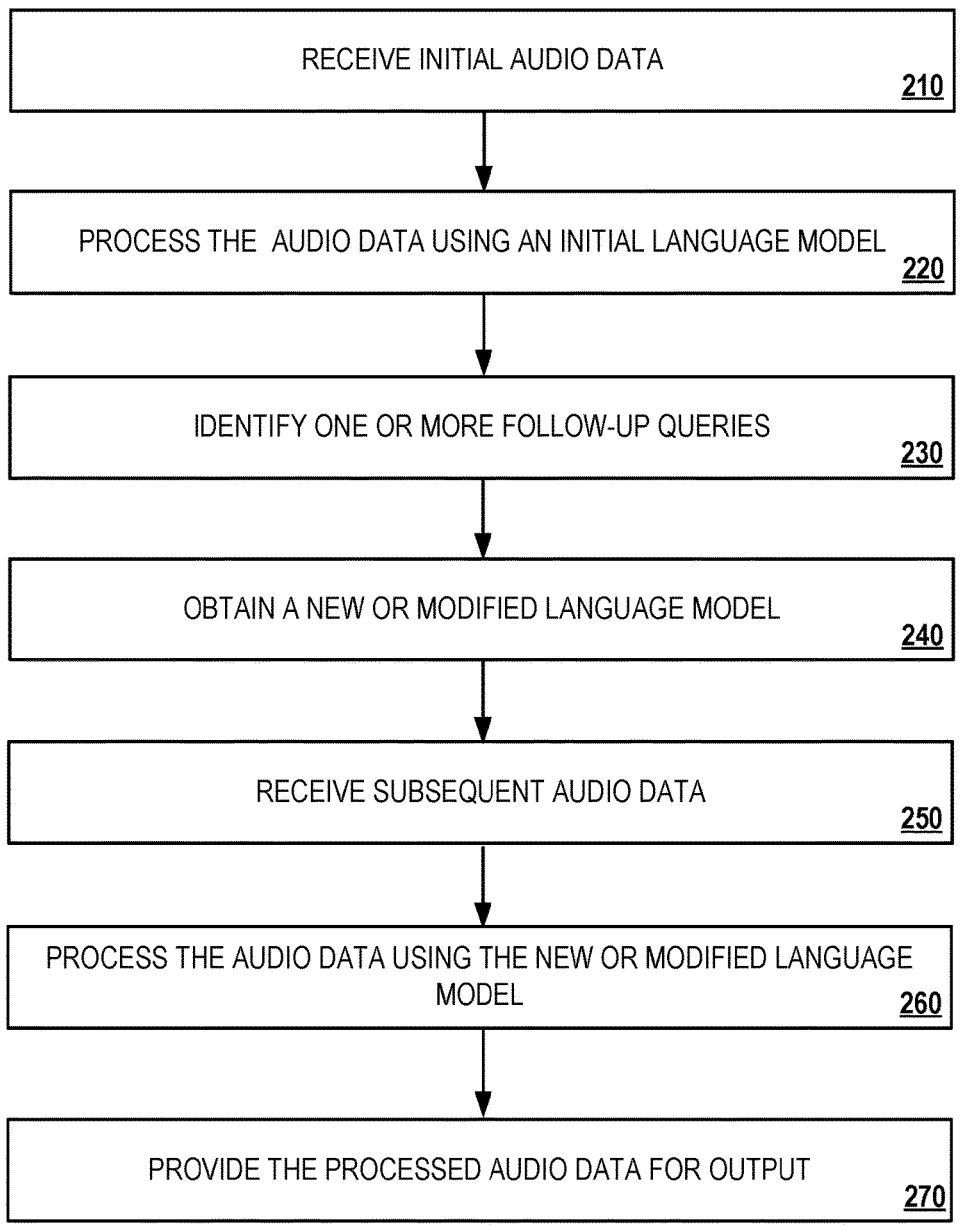
FIG. 2 illustrates an exemplary process for improving speech recognition using predicted follow-up queries for a user.

FIG. 2 illustrates an exemplary process 200 for improving speech recognition using predicted follow-up queries for a user. Briefly, the process 200 can include receiving initial audio data (210), processing the audio data using an initial language model (220), identifying one or more follow-up queries (230), obtaining a new or modified language model (240), receiving subsequent audio data (250), processing the audio data using the new or modified language model (260), and providing the processed audio data for output (270).

In more detail, the process 200 can include receiving initial audio data (210). For instance, the ASRM 110 may receive audio data 104b corresponding to an utterance of the initial voice query 104a of the user 102.

The process 200 can include processing the audio data using an initial language model (220). For instance, the ASRM 110 may process the audio data 104b using an initial language model 130a to generate the transcription 104d of the utterance of the initial voice query 104a.

The process 200 can include identifying one or more follow-up queries (230). For instance, the ASRM 110 may identify one or more follow-up queries from the table 120. The follow-up queries may be pre-associated with the transcription 104d of the utterance of the initial voice query 104a of the user 102. In some implementations, the follow-up queries may also be pre-associated with one or more search results associated with the transcription 104d of the utterance, or the data associated with the one or more search results, e.g., prior search queries, prior search results, documents responsive to the corresponding search query.

The process 200 can include obtaining a new or modified language model (240). For instance, the ASRM 110 may obtain the language model 130b where a respective transcription probability associated with the one or more follow-up queries is increased with respect to the language model 130a. As depicted in the example in FIG. 1, the ASRM 110 may use the table 120 to predict "OPENING HOURS OF LOUVRE" as a follow-up voice query to the initial voice query "MUSEUMS IN PARIS" from the user 102. This is reflected in the transcription score for the "OPENING HOURS OF LOUVRE" within the language model 130b being greater than its corresponding transcription score within the language model 130a (e.g., 0.56 and 0.4, respectively).

The process 200 can include receiving subsequent audio data (250). For instance, the ASRM 110 may receive the audio data 106b corresponding to the utterance of the subsequent voice query 106a of the user 102.

The process 200 can include processing the audio data using the new or modified language model (260). For instance, the ASRM 110 may process the subsequent audio data 106b using the language model 130b to generate the transcription 106d of the utterance of the subsequent voice query 106a.

The process 200 can include providing the processed audio data for output (270). For instance, the ASRM 110 may provide the transcription 106d of the utterance of the subsequent voice query 106a for output to a device associated with the user 102.

Figure 3:
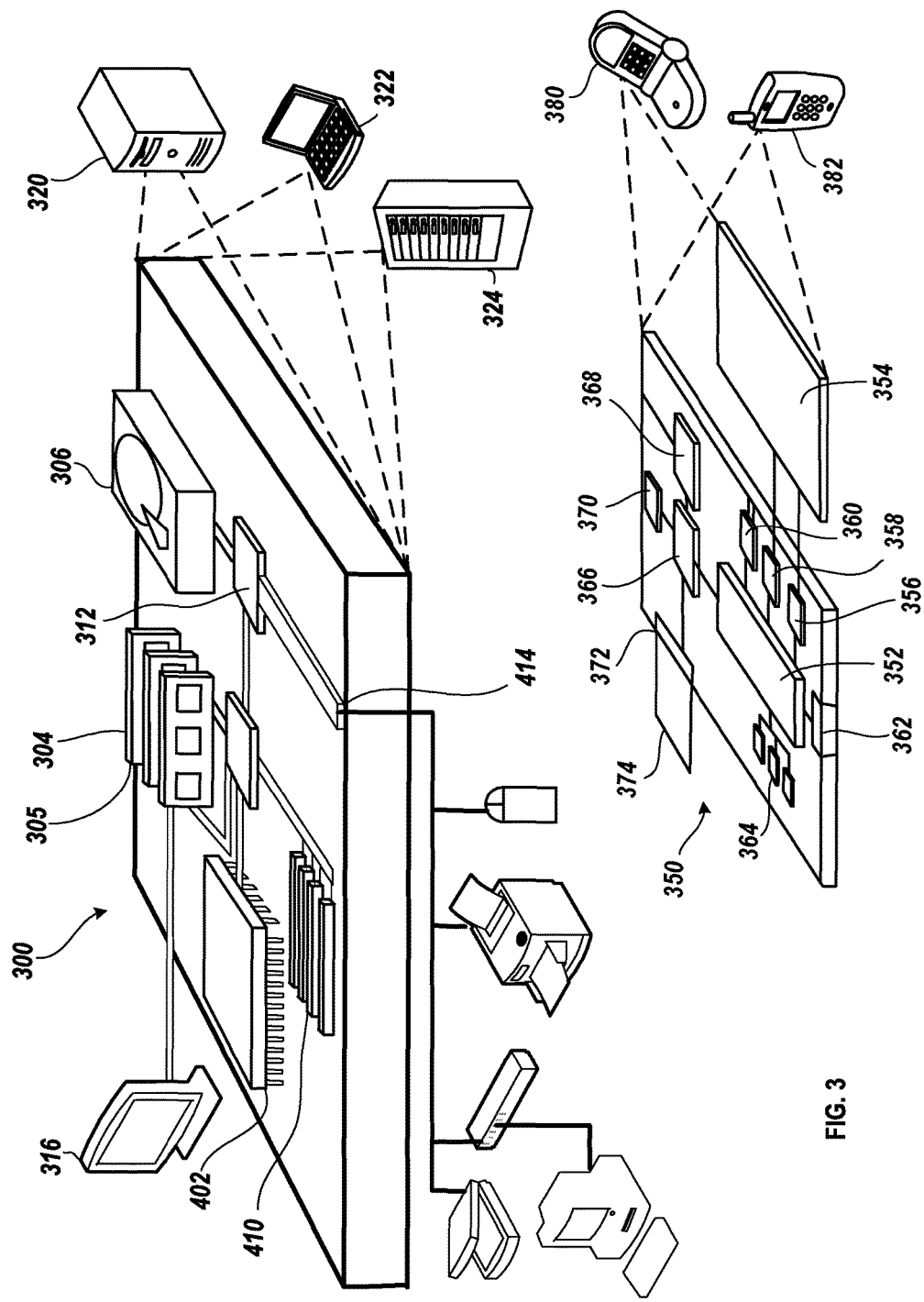
FIG. 3 is a block diagram of computing devices on which the processes described herein, or portions thereof, may be implemented.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices.

Additionally, computing device 300 or 350 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth intensive operations. Such allocation of functions is exemplary only. In one implementation, the high-speed controller 308 is coupled to memory 304, display 316, e.g., through a graphics processor or accelerator, and to high-speed expansion ports 310, which may accept various expansion cards (not shown). In the implementation, low-speed controller 312 is coupled to storage device 306 and low-speed expansion port 314. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, and an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. Additionally, the processor may be implemented using any of a number of architectures. For example, the processor 310 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound, e.g., voice messages, music files, etc. and may also include sound generated by applications operating on device 350.

The computing device 350 may be implemented in a number of different forms, as shown in the figure. For example, it may be implemented as a cellular telephone 480. It may also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   obtaining an initial utterance of a user that is provided at a particular location;
   identifying one or more follow-up queries that are pre-associated with a term that matches a transcription of an initial utterance of the user, wherein the follow-up queries are (i) different than the term, and (ii) are pre-associated with the term based on query log data indicating that other users of a search engine have previously submitted the follow-up queries at the particular location after submitting an initial query that includes the term at the particular location;
   adjusting an initial language model to generate a modified language model, the modified language model specifying a respective probability associated with one or more of the follow-up queries that is increased with respect to the initial language model;
   receiving subsequent audio data corresponding to a subsequent utterance of the user that is provided at the particular location;
   processing the subsequent audio data using the modified language model to generate a transcription of the subsequent utterance; and
   providing the transcription of the subsequent utterance for output to the user.

2. The method of claim 1, further comprising:
   receiving initial audio data corresponding to an initial utterance of a user; and
   processing the audio data using the initial language model to generate a transcription of the initial utterance.

3. The method of claim 1, wherein adjusting the initial language model comprises:
   accessing a database including one or more follow-up query mappings, each follow-up query mapping specifying a list of candidate follow-up queries for (i) prior transcriptions of utterances of the user, (ii) prior search results associated with the user, and (iii) data associated with the prior search results associated the user;
   determining that one or more terms of the transcription of the initial utterance of the user are included within the one or more follow-up query mappings; and
   adjusting the initial language model to increase the respective probability associated with the list of candidate follow-up queries that correspond to the one or more terms of the transcription of the initial utterance of the user that are included within the one or more follow-up query mappings.

4. The method of claim 3, wherein the list of candidate follow-up queries that are included within the one or more follow-up query mappings is based at least on a user location associated with the initial utterance of the user.

5. The method of claim 3, wherein determining that one or more terms of the transcription of the initial utterance of the user are included within the one or more follow-up query mappings comprises determining that the particular context associated with the initial utterance of the user matches a context associated with a particular transcription of a prior utterance of the user.

6. The method of claim 3, wherein each of the one or more follow-up query mappings further specifies one or more follow-up terms for (i) prior transcriptions of utterances of the user, (ii) prior search results associated with the user, and (iii) data associated with the prior search results associated the user.

7. The method of claim 1, wherein processing the audio data using the modified language model comprises determining that a particular context associated with the initial utterance of the user matches a particular context associated with the subsequent utterance of the user.

8. A computer-implemented method comprising:
obtaining an initial utterance of a user that is provided at a particular location;
identifying one or more follow-up queries that are pre-associated with a term that matches a transcription of an initial utterance of the user, wherein the follow-up queries are (i) different than the term, and (ii) are pre-associated with the term based on query log data indicating that other users of a search engine have previously submitted the follow-up queries at the particular location after submitting an initial query that includes the term at the particular location;
adjusting an initial language model to generate a modified language model, the modified language model specifying a respective probability associated with one or more of the follow-up queries that is increased with respect to the initial language model;
receiving subsequent audio data corresponding to a subsequent utterance of the user that is provided at the particular location;
processing the subsequent audio data using the modified language model to generate a transcription of the subsequent utterance; and
providing the transcription of the subsequent utterance for output to the user.

9. The method of claim 8, further comprising:
receiving initial audio data corresponding to an initial utterance of a user; and
processing the audio data using the initial language model to generate one or more search results associated with a transcription of an initial utterance of the user.

10. The method of claim 8, wherein adjusting the initial language model comprises:
accessing a database including one or more follow-up query mappings, each follow-up query mapping specifying a list of candidate follow-up queries for (i) prior transcriptions of utterances of the user, (ii) prior search results associated with the user, and (iii) data associated with the prior search results associated the user;
determining that one or more terms of the transcription of the initial utterance of the user are included within the one or more follow-up query mappings; and
adjusting the initial language model to increase the respective probability associated with the list of candidate follow-up queries that correspond to the one or more terms of the transcription of the initial utterance of the user that are included within the one or more follow-up query mappings.

11. The method of claim 10, wherein the list of candidate follow-up queries that are included within the one or more follow-up query mappings is based at least on a user location associated with the initial utterance of the user.

12. The method of claim 10, wherein determining that one or more terms of the transcription of the initial utterance of the user are included within the one or more follow-up query mappings comprises determining that the particular context associated with the initial utterance of the user matches a context associated with a particular transcription of a prior utterance of the user.

13. The method of claim 10, wherein each of the one or more follow-up query mappings further specifies one or more follow-up terms for (i) prior transcriptions of utterances of the user, (ii) prior search results associated with the user, and (iii) data associated with the prior search results associated the user.

14. The method of claim 8, wherein processing the audio data using the modified language model comprises determining that a particular context associated with the initial utterance of the user matches a particular context associated with the subsequent utterance of the user.

15. A computer-implemented method comprising:
obtaining an initial utterance of a user that is provided at a particular location;
identifying one or more follow-up queries that are pre-associated with a term that matches a transcription of an initial utterance of the user, wherein the follow-up queries are (i) different than the term, and (ii) are pre-associated with the term based on query log data indicating that other users of a search engine have previously submitted the follow-up queries at the particular location after submitting an initial query that includes the term at the particular location;
adjusting an initial language model to generate a modified language model, the modified language model specifying a respective probability associated with one or more of the follow-up queries that is increased with respect to the initial language model;
receiving subsequent audio data corresponding to a subsequent utterance of the user that is provided at the particular location;
processing the subsequent audio data using the modified language model to generate a transcription of the subsequent utterance; and
providing the transcription of the subsequent utterance for output to the user.

16. The method of claim 15, further comprising:
receiving initial audio data corresponding to an initial utterance of a user; and
processing the audio data using the initial language model to generate one or more search results associated with a transcription of an initial utterance of the user.

17. The method of claim 15, wherein adjusting the initial language model comprises:
accessing a database including one or more follow-up query mappings, each follow-up query mapping specifying a list of candidate follow-up queries for (i) prior transcriptions of utterances of the user, (ii) prior search results associated with the user, and (iii) data associated with the prior search results associated the user;
determining that one or more terms of the transcription of the initial utterance of the user are included within the one or more follow-up query mappings; and
adjusting the initial language model to increase the respective probability associated with the list of candidate follow-up queries that correspond to the one or more terms of the transcription of the initial utterance of the user that are included within the one or more follow-up query mappings.

18. The method of claim 17, wherein the list of candidate follow-up queries that are included within the one or more follow-up query mappings is based at least on a user location associated with the initial utterance of the user.

* * * * *